United States Patent

Campbell et al.

[15] 3,665,487

[45] May 23, 1972

[54] STORAGE STRUCTURE FOR MANAGEMENT CONTROL SUBSYSTEM IN MULTIPROGRAMMED DATA PROCESSING SYSTEM

[72] Inventors: Donald J. Campbell, Lansdale; William J. Heffner, Robesonia, both of Pa.; Paul H. Jennings, Mesa; Jane E. King, Sun City, both of Ariz.

[73] Assignee: Honeywell Information Systems Inc.

[22] Filed: June 5, 1969

[21] Appl. No.: 830,724

[52] U.S. Cl. ....................444/1, 340/172.5

[51] Int. Cl. ....................G05b 19/18

[58] Field of Search ....................340/172.5

[56] References Cited

UNITED STATES PATENTS

| | | | |
|---|---|---|---|
| 3,234,524 | 2/1966 | Roth | 340/172.5 |
| 3,297,999 | 1/1967 | Shimabukuro | 340/172.5 |
| 3,373,408 | 3/1968 | Ling | 340/172.5 |
| 3,411,147 | 11/1968 | Packard | 340/172.5 |
| 3,413,613 | 11/1968 | Bahrs et al. | 340/172.5 |
| 3,496,550 | 2/1970 | Schachner | 340/172.5 |
| 3,525,080 | 8/1970 | Couleur et al. | 340/172.5 |
| 3,566,357 | 2/1971 | Ling | 340/172.5 |
| 3,548,384 | 12/1970 | Barton et al. | 340/172.5 |

*Primary Examiner*—Paul J. Henon
*Assistant Examiner*—Paul R. Woods
*Attorney*—Edward W. Hughes and Fred Jacob

[57] ABSTRACT

A management control subsystem for a multiprogrammed data processing system, wherein large amounts of virtual working storage are provided for chains of operating system programs performing services for user programs without substantially reducing the real working storage space available for other user programs.

4 Claims, 2 Drawing Figures

INVENTORS
DONALD J. CAMPBELL
WILLIAM J. HEFFNER
PAUL H. JENNINGS
JANE E. KING
BY
ATTORNEY

EXPANDED
SLAVE SERVICE AREA
(SSA)

STORAGE STRUCTURE FOR MANAGEMENT CONTROL SUBSYSTEM IN MULTIPROGRAMMED DATA PROCESSING SYSTEM

BACKGROUND OF THE INVENTION

This invention relates to multiprogrammed data processing systems and more particularly to a management control subsystem for multiprogrammed data processing systems.

A multiprogrammed data processing system provides simultaneous execution of a number of user programs. In the modern multiprogrammed data processing system each of the one or more data processors thereof alternately executes successive portions of a plurality of user programs. In such system, a data processor assigned to execute a particular user program continues until the program either voluntarily relinquishes control of the data processor or is involuntarily interrupted. A program relinquishes control when it cannot continue until after the occurrence of some future event, such as the receipt of input data or when it terminates. The released processor is immediately assigned to execute another waiting and ready program, either commencing initial execution of a new program, or execution of a program from its last point of relinquishment or interruption. The processor again continues this program in execution until a new point is reached wherein the program relinquishes the processor or the program is interrupted. Meanwhile the voluntarily relinquishing programs stand by, awaiting the occurrences of their respective required events, whereupon they again become candidates for further execution. The interrupted programs, on the other hand, usually are immediate candidates for execution, but must wait assignment of a data processor according to a predetermined rule designed to maintain maximum system efficiency.

A program comprises a series of instructions for directing the assigned data processor to execute in sequence the individual steps necessary to perform a particular data processing operation. The data processor communicates with the working store of the system to retrieve from respective cells thereof each instruction to be executed and data items to be processed and to store therein data items which have been processed. Most of the instructions comprise an order portion denoting the type of operation the data processor must execute and an address portion representing the location of a cell in working storage from which a data item is to be retrieved for processing or into which a processed data item is to be inserted. Moreover, the data processor supplies an address representation to denote the cell from which the next instruction is to be obtained.

Because the retrieval and storage time of working storage must be very short for compatibility with the very rapid rate of instruction execution of the modern data processor, the cost of working storage capacity is relatively great. Therefore, economical reasons limit the size of the fast operating working store and, accordingly, the number of programs and quantity of information it can store at a particular time. In the large modern multiprogrammed data processing systems supplemental storage must be provided for holding all user programs received from input devices and awaiting scheduling for execution, user program "libraries," and data files. This supplemental storage is provided by mass quantities of relatively inexpensive and slow "auxiliary storage." The auxiliary store is coupled for communication with the working store to supply programs and information to working storage as they are required for processing. Additionally, the auxiliary store relieves working storage of processed data, providing temporary storage prior to transmittal of the processed data to an output device.

In order that the data processors can perform efficiently the required sequential and fragmented execution of user programs in a multiprogrammed data processing system, at least a portion of each of the user programs currently in process must be held in the working storage portion of the system. A data processor is thereby enabled instantly to retrieve from working storage and execute the next following instruction of the user program it is currently executing or the first required instruction of the user program that succeeds the relinquishment by or interruption of another user program. Therefore, the following definition provides a functional picture of the nature and operation of a modern multiprogrammed data processing system:

> The operation of a data processor so as to process a set of user programs effectively concurrently by alternating and interleaving their execution, wherein the working store contains simultaneously at least a subset of said set of programs.

To implement multiprogramming, a management control subsystem including a group of management control programs, program parts, and subroutines is required for exercising supervisory control over the data processing system. The group of management control programs, program parts, and subroutines is termed an "operating system." The primary purpose of the operating system is to maintain the user programs in efficient concurrent execution by effective allocation of the limited system resources to the programs, these resources including the data processors, working store, and input and output equipment. The operating system performs the following characteristic functions:

1. Scheduling, dispatching, and coordinating programs, and loading programs, program parts, and subroutines into working storage.
2. Retrieving programs, program parts, subroutines, and information from auxiliary storage when required.
3. Allocating and overlaying working storage.
4. Assigning input/output (I/O) channels and devices to programs.
5. Initiating I/O operations and supervising the termination of these operations.
6. Removing a program from working storage when it terminates or when certain error conditions occur.
7. Maintaining a program library and a user file system.
8. Maintaining a log of system operation and preparing accounting information.

For simplicity, the terms "program" and "program part" will be used interchangably hereinafter to mean a program, program part or subroutine. The term "module" will be used hereinafter to mean an operating system program part or subroutine.

In the prior art multiprogrammed data processing systems, a portion of working storage is reserved for holding all operating system programs and modules which are in execution. User programs, on the other hand, are loaded into and executed from any available region of the non-reserved portion of working storage. A number of operating system programs and modules are permanently resident in one region of the reserved portion of working storage, whereas the remainder of the reserved portion is occupied by a variable number of different operating system programs and modules that are transferred from auxiliary storage to the reserved portion of working storage as they are required. The permanently resident portion of the operating system consists of those programs and modules which are most frequently required and which must be available immediately for maintaining most efficient continued operation of the multiprogrammed system. The permanently resident programs include, for example, the dispatcher, which queues user programs and dispatches them to data processors for execution, and the working storage allocator, which maintains a continuous surveillance of the assigned and available working storage space and allocates available working storage space to programs. The temporarily resident modules include those which perform direct service functions for user programs, functions which the user programs, themselves, are unable or are not permitted to perform. The temporarily resident modules include, for example, a module which obtains for a user program the identity of the I/O apparatus assigned to serve such program, and the program termination subroutine, which provides for the orderly completion of terminating programs.

The amount of working storage space reserved in these prior art multiprogrammed systems is sufficient to hold all of the essential operating system programs and modules that may be required to be in simultaneous execution. If adequate working storage space is not made available for the operating system, the data processing system may be greatly slowed or even may be unable to continue in operation. Accordingly, these prior art management control subsystems reserve permanently a very large portion of the working store for the operating system, in order to accommodate the working storage space requirements for the anticipated worst-case conditions. With such a large portion of working storage reserved for the operating system, only a limited number of user programs can occupy the remaining non-reserved portion of working storage. This adversely affects the overall performance of these prior art data processing systems, because their primary function is to execute user programs, and often there is no user program in working storage ready for execution. In such instance either a data processor must stand idle, awaiting the occurrence of one of the events required for the resumption of a user program, or at least one of the waiting user programs in the working store must be "swapped" with another user program in the auxiliary store. However, considerable non-productive time is expended in swapping one user program for another, because the I/O system usually must return to auxiliary storage at least part of the user program being replaced and must then load the next user program into the released region of working storage. Therefore, it is a particular disadvantage of these prior art management control subsystems to reserve a large portion of working storage space for the operating system.

Another disadvantage of the aforementioned prior art management control subsystems is that much of the large reserved portion of working storage is often idle, because most of the time only a few of the operating system programs and modules are required to be in execution. This reservation of a large amount of idle working storage space, which is not available for the waiting user programs, is inconsistent with an operating system's primary purpose of effective allocation of system resources to maintain user programs in efficient concurrent execution.

Accordingly, it is desirable to provide means to reduce the amount of working storage space reserved for holding operating system programs and modules so as to free space for user programs, yet to provide sufficient working storage space for all essential operating system programs and modules required to be in simultaneous execution. Moreover, it is desirable to provide means to reduce the amount of idle working storage space not available for user programs.

Therefore, it is the principal object of this invention to provide an improved management control subsystem for a multiprogrammed data processing system.

Another object of this invention is to provide an improved operating system for a multiprogrammed data processing system.

Another object of this invention is to provide a management control subsystem for a multiprogrammed data processing system which affords more effective utilization of working storage.

Another object of this invention is to provide a management control subsystem which minimizes the amount of working storage reserved for the operating system.

Another object of this invention is to provide a management control subsystem which minimizes the amount of idle working storage space not available for user programs.

Another object of this invention is to provide a management control subsystem which minimizes the amount of idle storage space reserved for the operating system.

In the prior art multiprogramming systems described, a number of different operating system programs serving the same user program often are resident in the reserved portion of working storage, thereby denying a substantial portion of working storage to other programs. Frequently, an operating system program, while performing a service for a user program, requires, in turn, the services of another operating system program. For example, if an operating system program requires information from the auxiliary store it calls for an I/O supervisor program to obtain the information. An operating system program calling another suspends execution and the called program commences execution. However, the calling operating system program remains in working storage because it has not completed execution. Thus, at times a chain of operating system programs and modules may be resident in the working store, all assigned to provide services directly or indirectly for the same user program.

Another user program requiring the services of an operating system program may be involuntarily suspended for a relatively long period because the reserved storage space is occupied with a chain of operating system programs providing services for a different user program. This indirect monopolization of the working store by a user program adversely affects the overall performance of the data processing system.

Accordingly, it is desirable to provide means to reduce the number of operating system programs and modules simultaneously in working storage providing services for the same user program, while at the same time ensuring the availability of working storage space for all operating system programs required by each user program in execution.

Therefore, it is another object of this invention to provide an improved management control subsystem which prevents the monopolization of working storage space on behalf of a particular user program.

Another object of this invention is to provide an improved management control subsystem which minimizes the amount of working storage space occupied by operating system programs providing services for a particular user program.

Another object of this invention is to provide an improved management control subsystem which ensures working storage space for operating system programs required by user programs in execution.

SUMMARY OF THE INVENTION

The foregoing objects are achieved according to the instant invention by providing, in a multiprogrammed data processing system, a management control subsystem which reserves a varying amount of working storage according to the number of user programs in execution and which also reserves a push-down stack in auxiliary storage for each user program in execution. According to one embodiment of the instant invention, the operating system of the management control subsystem reserves a management control block in working storage for each user program in execution. Management control blocks are reserved for the use of the operating system in providing management control services for the corresponding user programs. A management control block comprises a set of contiguous working storage cells and is disposed adjacent to the corresponding user program in whatever region of working storage the user program is loaded. The working storage space for each management control block is reserved only when a user program is allocated working storage and, therefore, the number of blocks for which space is reserved corresponds to the number of user programs in execution.

The management control blocks of the instant invention supply most of the working storage space requirements of the operating system for managing, supervising, and servicing the needs of the corresponding user programs. The operating system modules which provide direct services for a particular user program are loaded into and executed from the management control block adjacent to that user program. In addition, the operating system stores much of the management information relating to each user program in the corresponding management control block. Therefore, the amount of working storage space reserved for holding the operating system programs and modules that provide direct management services for the user programs and for holding management information corresponds to the number of user programs in current execution.

Where a chain of operating system modules are required to provide services for a particular user program, each module of the chain is executed from the management control block reserved for that user program. When a first operating system module that is in execution from a management control block requires the services of a second module, the first module suspends operation and calls for the second module. The operating system responds to the call and "pushes down" the first module. The push down function is accomplished by transferring the first suspended module to the auxiliary store from the management control block, loading the first module on top of the pushdown stack assigned to the user program for which the first module has been performing a service, pushing down such stack, and then overlaying the first module in the management control block with the second module. When execution of the second module is completed, the first module is retrieved from the top of the stack it occupies in auxiliary store, the stack is popped up, the second module is overlaid in the management control block with the first module, and execution of the first module is resumed from the point of suspension.

In this manner an entire chain of operating system modules can be executed for a particular user program from the same management control block. As each module of the chain is suspended, it is pushed down in auxiliary store on top of the stack of previously suspended modules of the chain. As each module of the chain terminates, the last pushed down module is retrieved from the top of the stack in auxiliary store and placed in execution in the management control block.

Therefore, the instant invention, by providing a flexible reserve of useable storage as the operating system requirements vary with the number of user programs in execution, affords a more effective utilization of the working store, maintains the maximum number of user programs in execution, and provides for the most efficient operation of the multiprogrammed data processing system.

Certain portions of the systems and processes herein disclosed are not our invention, but are the inventions of:

D. J. Campbell and W. J. Heffner, as defined by the claims of their application, Ser. No. 821,811, filed May 5, 1969; and D. J. Campbell, as defined by the claims of his application, Ser. No. 816,624, filed Apr. 16, 1969.

Both of the above applications are assigned to the assignee of the present application.

BRIEF DESCRIPTION OF THE DRAWING

The invention will be described with reference to the accompanying drawing, wherein.

It will be noted that the figures are numbered to correspond to the numbering of the figures of the Campbell et al. application, Ser. No. 821,811, referenced above.

Figure 1:
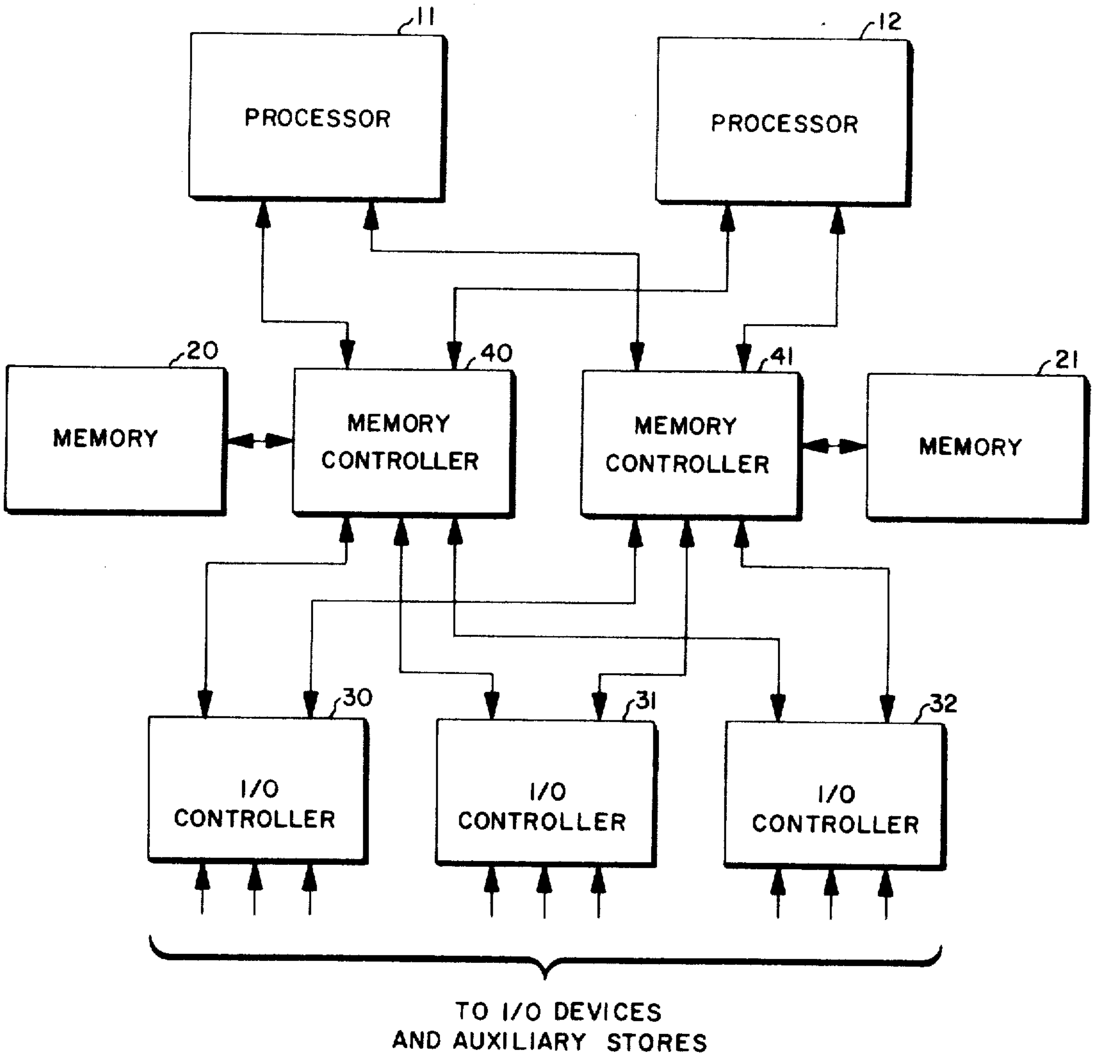
FIG. 1 is a block diagram of a data processing system to which the instant invention is applicable.
Figure 6:
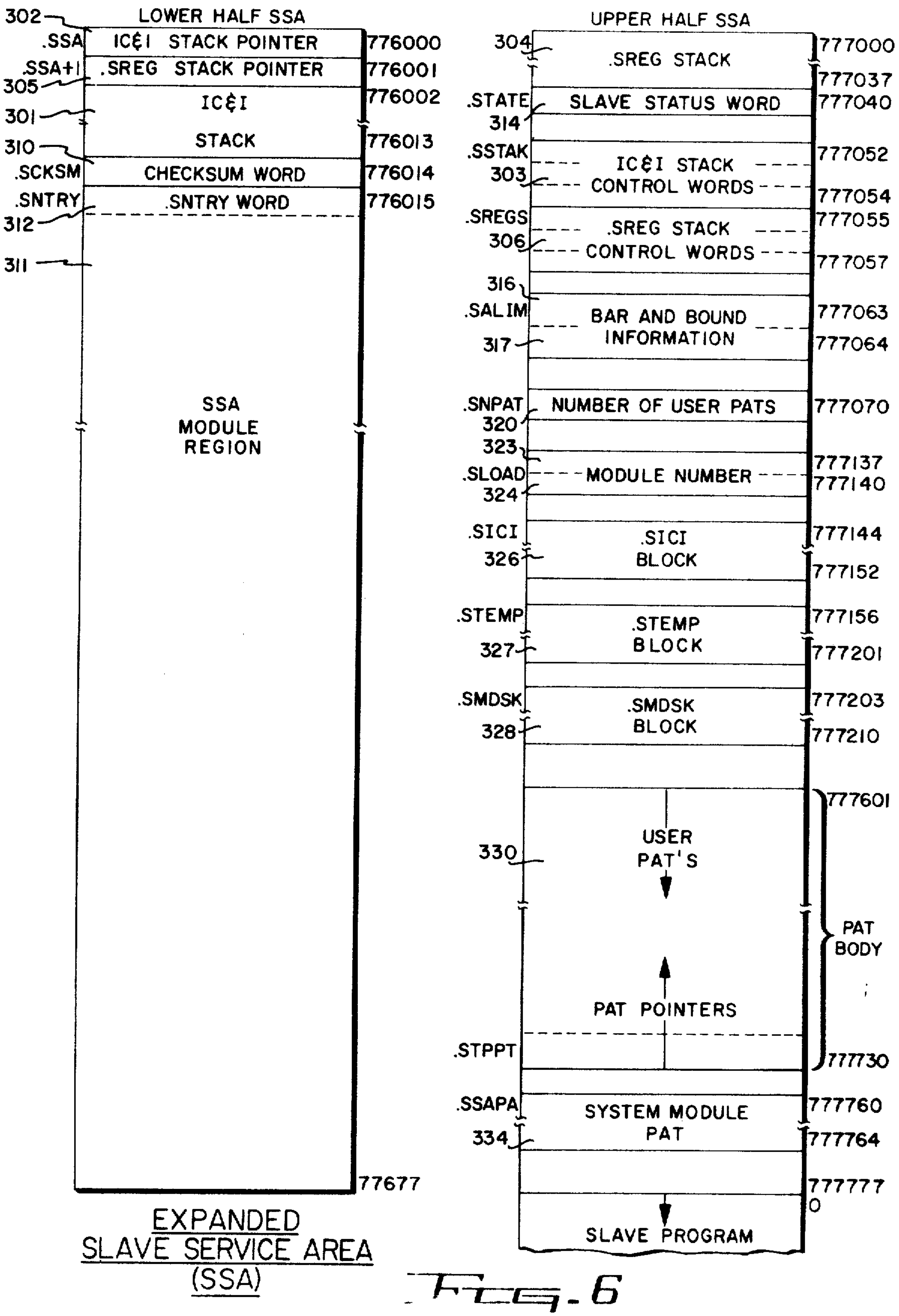
FIG. 6 is a diagram in further detail of the organization of a Slave Service Area of working storage.

For a complete description of the system and arrangement of FIGS. 1 and 6, of the process and operations performed thereby or with respect thereto, and of the present invention, reference is made to U.S. patent application, Ser. No. 821,811, filed May 5, 1969, entitled "Management Control Subsystem for Multiprogrammed Data Processing System" by D. J. Campbell and W. J. Heffner, and assigned to the assignee of the present invention. More particularly, attention is directed to FIGS. 2 through 5 and 7 through 49 of the drawings and to the specification beginning at page 18, line 6 and ending at page 185, line 16, of U.S. patent application, Ser. No. 821,811, which are incorporated herein by reference and made a part hereof as if fully set forth herein.

We claim:

1. A method of supervising a data processing system having a working store memory, an auxiliary store coupled for communication with said working store memory, and a data processor connected to said memory for executing programs resident therein in a multiprogramming mode, comprising:

A. storing a resident monitor program in said working store memory, including
   1. storing in said memory a fault processing program module responsive to fault invoking instructions in said working store memory to initiate an operating system function, and
   2. storing in said memory a dispatcher program module for fetching operating system program modules from said auxiliary store in response to said fault processing module;

B. allocating portions of the remainder of said working store memory storage to a plurality of slave programs;

C. allocating, for each of said slave programs, an additional portion of said working store memory for a slave service area, and allocating therein push-down stack mechanisms including
   1. allocating a cell for the saved contents of the instruction register,
   2. allocating a set of cells for stacking the saved contents of the working registers;

D. allocating areas of said auxiliary store for storing stacks of interrupted executing programs from said slave service areas;

E. storing control system programs in areas of said auxiliary store to serve the slave programs loaded into working store memory;

F. loading a slave program into one of said allocated portions of memory allocated to slave programs;

G. initiating execution of said slave program;

H. loading and executing a first operating system program module in response to executing an instruction requesting an operating system function;

I. performing a push-down stacking operation in response to executing an instruction in said first supervisory program requesting a second operating system function including
   i. loading the contents of the working registers and instruction counter into the slave service area for said slave program,
   ii. storing the contents of said slave service area in said auxiliary store,
   iii. loading into said slave service area a second operating system module for performing said second function, overlaying said first module;

J. performing a push-up stacking operation in response to termination of said second module program including loading the pushed-down module from said auxiliary store into said slave service area, and loading the working registers and instruction counter with said saved contents thereof.

2. The method of claim 1, further comprising:

K. returning to the execution of said slave program upon terminating said first operating system function.

3. A method of supervising a data processing system having a working store memory, an auxiliary store coupled for communication with said working store memory, and a data processor, including an instruction counter and working registers, connected to said memory for executing programs resident therein in a multiprogramming mode, comprising:

A. storing a resident monitor program in said working store memory, said monitor program including
   1. a fault processing program module responsive to fault invoking instructions in said working store memory to initiate an operating system function, and
   2. a dispatcher program module for fetching operating system program modules from said auxiliary store in response to said fault processing module;

B. subdividing the remaining portion of said memory into blocks of available storage;

C. allocating, for each of said slave programs, a set of said blocks of available storage to a plurality of slave programs;

D. allocating, for each of said slave programs, a block of said available storage for a slave service area, and allocating therein push-down stack areas including 1. allocating a set of cells for stacking a plurality of saved return entry addresses, 2. allocating a set of cells for stacking a plurality of saved contents of the working registers, 3. allocating cells for pointing to the tops of the saved instruction register and working registers;

E. allocating areas of said auxiliary store for storing stacks of interrupted executing programs from said slave service area;

F. storing control system programs in areas of said auxiliary store to serve the slave programs loaded into working store memory;

G. storing slave programs in said sets of blocks of available storage, said slave programs including operating system fault invoking instructions;

H. executing said slave programs;

I. responding to said fault invoking instructions by using said fault processing module and using said push-down stack areas to store a return address and the contents of the working registers;

J. loading a first control system program module into said slave service area from the auxiliary store and executing said program module, using said dispatcher program;

K. responding to a fault invoking instruction in said first control system program module by using said push-down stack mechanism as in (1), transferring said first module to auxiliary store, and transferring said second module program from the auxiliary store to overlay said first module program;

L. returning said first module program to said slave service area upon termination of said second module program, restoring the contents of said working registers and the instruction counter with the push-down return address, using said dispatcher program module.

4. The method of claim 3 further comprising:

M. storing a routine in said slave service areas for push-down and pop-up service of said sets of cells for stacking and unstacking the contents of the working registers and the instruction counter.

* * * * *